(12) United States Patent
Peterson et al.

(10) Patent No.: US 9,895,674 B1
(45) Date of Patent: Feb. 20, 2018

(54) MULTI-FUNCTIONAL MEDIA FOR THE REMOVAL OF BASIC AND ACIDIC GASES AND OTHER TOXIC VAPORS

(71) Applicant: U.S. Army Edgewood Chemical and Biological Command, APG, MD (US)

(72) Inventors: Gregory W. Peterson, Belcamp, MD (US); Joseph A Rossin, Columbus, OH (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 138 days.

(21) Appl. No.: 14/853,177

(22) Filed: Sep. 14, 2015

(51) Int. Cl.
*B01J 20/06* (2006.01)
*B01D 53/58* (2006.01)
*B01D 53/50* (2006.01)
*B01J 20/28* (2006.01)
*B01J 20/04* (2006.01)
*B01J 20/32* (2006.01)

(52) U.S. Cl.
CPC ............ *B01J 20/06* (2013.01); *B01D 53/508* (2013.01); *B01D 53/58* (2013.01); *B01J 20/046* (2013.01); *B01J 20/28071* (2013.01); *B01J 20/3204* (2013.01); *B01J 20/3236* (2013.01); *B01D 2251/108* (2013.01); *B01D 2251/604* (2013.01); *B01D 2251/608* (2013.01)

(58) Field of Classification Search
None
See application file for complete search history.

(56) References Cited

U.S. PATENT DOCUMENTS

| | | | | |
|---|---|---|---|---|
| 5,306,684 A * | 4/1994 | Itoh | ............... | B01D 53/9418 502/60 |
| 5,884,473 A * | 3/1999 | Noda | ............... | B01D 53/945 422/177 |
| 7,927,699 B2 * | 4/2011 | Okamoto | ............... | B01J 21/066 423/608 |
| 2003/0061860 A1 * | 4/2003 | Hu | ............... | B01D 53/9454 73/23.31 |
| 2005/0042151 A1 * | 2/2005 | Alward | ............... | B01D 39/2082 422/177 |
| 2011/0250112 A1 * | 10/2011 | Vernoux | ............... | B01D 53/945 423/213.2 |

OTHER PUBLICATIONS

Dynamic Ceramic Material Properties (2016).*

* cited by examiner

*Primary Examiner* — Melvin C Mayes
*Assistant Examiner* — Sheng H Davis
(74) *Attorney, Agent, or Firm* — Ulysses John Biffoni

(57) ABSTRACT

Provided are processes of removing or sequestering a basic or an acid gas from a sample by contacting the sample with a filtration media that includes a porous zirconium hydroxide impregnated with a transition metal reactant. The resulting filtration media has the ability to remove or sequester both acid and basic gases, is stable, and highly functional so as to be useful in protective equipment or other filtration systems.

19 Claims, No Drawings

MULTI-FUNCTIONAL MEDIA FOR THE REMOVAL OF BASIC AND ACIDIC GASES AND OTHER TOXIC VAPORS

U.S. GOVERNMENT INTEREST

The invention described herein may be manufactured, used and licensed by or for the U.S. Government.

FIELD

This invention relates to a process employing zirconium hydroxide impregnated with metal salts for removing $NH_3$ and acid gases from streams of dry and humid air.

BACKGROUND

The US Army has identified a need to achieve broad spectrum chemical protection for breathing equipment supplied for individual and collective protection applications. This need has arisen due to threats associated with toxic industrial chemicals (TICs). Toxic industrial chemicals are defined as chemicals that are manufactured on an industrial scale and readily used and transported around the globe. Examples of TICs for which chemical protection is desired include, but are not limited to, ammonia ($NH_3$), sulfur dioxide ($SO_2$), chlorine ($Cl_2$), hydrogen cyanide (HCN), nitrogen dioxide ($NO_2$) and hydrogen sulfide ($H_2S$). There is also a need to provide safe breathing for first responders and military personnel, among others, who enter chemically contaminated areas to lend assistance and contain the toxic chemical spill. For these situations/scenarios, the chemical threat is often unknown at the time of the toxic chemical release. As a result, it is often not feasible to analyze the air stream for the toxic gas, then select a respirator specifically designed to remove the toxic gas. It is also not feasible, from a cost and logistic aspect, to retain or transport a number of dissimilar respirators to handle the range of the threat. Therefore, the desire is for one respirator to meet the demands of the broad spectrum toxic chemical challenge.

There is also a need to provide safe breathing for personnel working in hazardous environments in the event of a chemical spill, for example, or for those working with or operating processes that utilize or generate toxic vapors. In yet further applications, many hazardous chemicals are employed on an industrial scale, and there is a need to scrub the process streams of these chemicals prior to venting the stream to atmosphere. One additional application involves power plants, where both $SO_2$ and $NH_3$ are eluted from the process. As $SO_2$ oxidizes to $SO_3$, it will react with the $NH_3$ and water forming ammonium bisulfate ($NH_4$)$HSO_4$ and/or ammonium sulfate (($NH_4$)$_2SO_4$), which will crystallize and plug downstream unit operations. A filtration media capable of simultaneously removing large amounts of both $NH_3$ and $SO_2$ would alleviate said burdens.

In order to remove both $NH_3$ and acid gases, a filtration material must possess both acid and basic sites. Amines, such as for example $NH_3$ and methylamine ($CH_3NH_2$) are readily removed by reactions involving mineral acids, such as for example HCl and $H_2SO_4$, according to reactions:

$$NH_3 + HCl \rightarrow NH_4Cl$$

$$2NH_3 + H_2SO_4 \rightarrow (NH_4)_2SO_4$$

$$2CH_3NH_2 + H_2SO_4 \rightarrow (CH_3NH_2)_2SO_4$$

Which yield solids and are well known to one skilled in the art. Ammonia will also undergo similar reactions with metal salts, such as for example:

$$2NH_3 + ZnCl_2 + H_2O \rightarrow 2NH_4Cl + ZnO$$

$$2NH_3 + NiSO_4 + H_2O \rightarrow (NH_4)_2SO_4 + NiO$$

On the other hand, basic sites are required for the removal of acid gases. For example:

$$Zn(OH)_2 + 2HCl \rightarrow ZnCl_2 + 2H_2O$$

$$CuO + SO_2 \rightarrow CuSO_3$$

$$ZnO \text{ or } Zn(OH)_2 + 2HCN \rightarrow Zn(CN)_2 + (1 \text{ or } 2)H_2O$$

The above reactions are stoichiometric in nature.

For a single filtration material to facilitate reactions involving the removal of amines, such as $NH_3$, and acid gases, such as $SO_2$, the material must possess a high concentration of both acid and basic sites. Otherwise, sufficient filtration capacity for each class of toxic chemicals will be insufficient. Materials with acidic and basic properties have been reported and are known to one skilled in the art. These include zeolites, aluminas, silicas and silica-aluminas, for example. These materials, however, have a relatively low number of either acidic sites or basic sites, and are thus not able to sufficiently facilitate filtration of both acidic and basic materials.

It is also difficult to impregnate materials with components that are both acidic and basic. This is because the two dissimilar functionalities will tend to neutralize each other. Doughty et al. (U.S. Pat. No. 5,492,882) reports the co-impregnation of activated carbon using solutions of copper carbonate, zinc carbonate, and ammonium dimolybdate dissolved in an ammonium carbonate/ammonium hydroxide solution. The authors add copper sulfate, zinc sulfate or ammonium sulfate as the ammonia removal function. The material also contains pre-adsorbed water, which is known to one skilled in the art to enhance removal of ammonia, as $NH_3$ is soluble in water. Doughty et al. report that the material is able to remove both $NH_3$ and $SO_2$ to levels sufficient to meet/exceed CEN Requirements. Although not reported in the patent, subsequent testing/evaluation of the material demonstrates that the filtration capability decrease significantly over time, such as following storage and/or exposure to humid air. These results indicate that the material is not stable.

As such, there is a need for a stable material that is capable of removing or sequestering both acid and basic gases. The inclusion of such materials in filtration apparatuses or safety systems such as breathing apparatuses is greatly desired.

SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A first aspect includes processes of removing or sequestering a basic gas, an acid gas, or both from a gaseous sample such as air contaminated with such a basic or acid gas. The processes address the need for using a single reactant media, in some aspects, capable of reacting with both acid and basic gases, is stable, and has sufficient reactivity to be used in protective equipment. A process of sequestering basic gases such as for example ammonia ($NH_3$) and methyl amine ($CH_3NH_2$), and acid gases, such as for example hydrochloric acid (HCl) and sulfur dioxide ($SO_2$), from streams of dry and humid air. Filtration media used in the processes have the ability to react with both acid and basic gases. Filtration media includes zirconium hydroxide ($Zr(OH)_4$) loaded with a transition metal reactant, such as for example, chlorides, sulfates and nitrates of one or more transition metals. The transition metal may be loaded at 1% to 40% by weight. In some aspects, the transition metal reactant comprises chlorides, sulfates or nitrates of vanadium, chromium, manganese, iron, cobalt, nickel, copper, zinc, sodium, magnesium, potassium, calcium, or combinations thereof. The basic gas sequestered by the process optionally includes $NH_3$, methyl amine, dimethyl amine, or combinations thereof. The acid gas sequestered by the process optionally includes HCl, HF, HBr, $SO_3$, $SO_2$, $HNO_3$, $H_2S$, or combinations thereof. The filtration media will react with and sequester any of the foregoing acid and basic gases or any combination thereof. Optionally the filtration media has an average pore volume of 0.1 $cm^3/g$ or greater. Optionally, the filtration media has a water content of 10% or less, optionally 3% or less prior to contacting said sample.

In other aspects, provided are filtration media with the capability of reacting with and removing both acid and basic gases using a single media type. A suitable filtration media includes porous metal comprising zirconium hydroxide, zirconium oxyhydroxide, zirconium oxide, or combinations thereof, and a transition metal reactant impregnated onto the porous metal. Optionally, the porous metal has a pore volume of 0.35 $cm^3/cm^3$ or greater. The transition metal reactant optionally includes zinc, cobalt, nickel, or combinations thereof. Optionally, the transition metal reactant includes a sulfate or chloride of iron, cobalt, nickel, copper, zinc, or combinations thereof. The transition metal reactant is optionally present at a concentration of 1 to 50 weight percent relative to the porous metal. The filtration media optionally has a water content of 10% or less.

In other aspects, processes of forming a filtration media with the capability of reacting with and sequestering both acid and basic gases using a single media type are provided. A process includes: dissolving zirconium hydroxide in an aqueous solvent; adjusting the pH of the aqueous solvent to a level sufficient to form precipitated zirconium hydroxide; drying the precipitated zirconium hydroxide for a drying time and at a drying temperature that does not exceed 200 degrees Celsius; and impregnating the precipitated zirconium hydroxide with a transition metal reactant to a concentration of 1 to 50% by weight relative to the precipitated zirconium hydroxide. In the process the transition metal reactant optionally includes zinc, cobalt, nickel, or combinations thereof. Optionally, the transition metal reactant includes a sulfate or chloride of iron, cobalt, nickel, copper, zinc, or combinations thereof.

DETAILED DESCRIPTION

The following description of particular aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "acidic gas" means a gas at 1 atmosphere and 25° C. that will form an acidic solution when dissolved in water.

As used herein, the term "basic gas" means a gas at 1 atmosphere and 25° C. that will form a basic solution when dissolved in water.

The novel processes described herein involve contacting gaseous sample, optionally in the form of a stream of contaminated air, where the sample includes an acid gas, a basic gas or a combination thereof, with a filtration material capable of removing by reacting with or sequestering both vapor phase basic gases and acid gases with a single particle. The filtration media as provided herein is capable of reacting or otherwise sequestering acid gases and basic gases. Illustrative examples of acid gases include but are not limited to the hydrogen halides (e.g. HCl, HF, HBr), $SO_3$, $SO_2$, $HNO_3$, $H_2S$ and the like. Illustrative examples of basis gases include but are not limited to R—$NH_2$, $R_2$—NH, $R_3$—N, phenyl-$NH_2$ where R is an alkyl, alkenyl, alkynyl, or aryl. Specific illustrative examples of basic gases include $NH_3$, methyl amine, dimethyl amine, etc., and acid gases, such as for example HCN and $SO_2$.

Filtration media may be in many forms, such as for example beads, extrudates, granules, etc. Filtration media may be housed in respirator bodies, such as for example when being used in individual protection filters. Alternatively, the filtration media may be housed in a larger bed such as for example when employed in collective protection applications, and still larger bodies, such as for example when employed in treating industrial waste streams. The design of the bed can be of many forms and configurations such that contact between the contaminated process stream and the media is brought about.

The flow of the process stream through the bed of media should be sufficient to allow for the desired amount of toxic vapor to be removed prior to breakthrough being achieved. Breakthrough, a term well known to one skilled in the art, refers to the point in the process when the concentration of the toxic chemical in the filter effluent stream exceeds a threshold value. In the case of $NH_3$, the threshold value is on the order of 25 ppm while in the case of sulfur dioxide, the threshold value is on the order of 5 ppm. However, these numbers are often based on specific application of use, and may vary considerably. Breakthrough time, a term well known to one skilled in the art, refers to the time from the start of the chemical challenge to the point in time where the effluent concentration of toxic chemical exceeds the threshold value, often referred to as the breakthrough concentration. The residence time of the process stream within the filter bed can vary greatly depending on the application. The residence time can range from less than 0.1 seconds to greater than 10 seconds, however, for respirator applications, the preferred residence time is on the order of 0.1 seconds to 0.35 seconds and more preferably on the order of 0.1 seconds to 0.2 seconds. For collective protection applications, the residence time is consistent, although slightly greater than residence times employed in respirator applications. For industrial applications, such as for example those involving the filtration of ammonia and/or sulfur dioxide from waste streams, the residence time may be quite large, depending on the concentration of contaminant in the waste stream and the desired period between filter change-out.

A filtration media includes zirconium hydroxide ($Zr(OH)_4$) employed as a substrate onto which one or more impregnants are dispersed. Although we refer to the substrate as zirconium hydroxide, the product may be in the form of a polymorph of zirconium hydroxide, zirconium oxyhydroxide or zirconium oxide. As sold on the commercial market, zirconium hydroxide is an amorphous, white powder that is insoluble in water. Zirconium hydroxide may be prepared by precipitating zirconium salts, such as for example zirconium oxynitrate and zirconium oxychloride, in aqueous solutions using alkaline solutions such as lithium hydroxide, sodium hydroxide and potassium hydroxide. The alkaline solutions can be used to increase the pH of the solution, thereby bringing about the formation of the porous zirconium hydroxide via precipitation. Other bases, such as ammonium hydroxide, can also be used.

Such processes optionally produce a porous zirconium hydroxide that is substantially pure. The term substantially pure is meant free of additional contaminating metals, salts, acids, or other materials that may detract from the effectiveness of the resulting porous metal hydroxide. Substantially pure optionally means 90% pure, optionally 91% pure, optionally 92% pure, optionally 93% pure, optionally 94% pure, optionally 95% pure, optionally 96% pure, optionally 97% pure, optionally 98% pure, optionally 99% pure, optionally 99.1% pure, optionally 99.2% pure, optionally 99.3% pure, optionally 99.4% pure, optionally 99.5% pure, optionally 99.6% pure, optionally 99.7% pure, optionally 99.8% pure, optionally 99.9% pure, or of greater purity.

Porous zirconium hydroxide optionally has a porosity representing a surface area of at least 100 $m^2/g$, optionally greater than 250 $m^2/g$. In some aspects, a surface area is from 100 $m^2/g$ to 600 $m^2/g$, or any value or range therebetween, optionally 250 $m^2/g$ to 600 $m^2/g$, optionally 100 $m^2/g$ to 450 $m^2/g$, optionally 250 $m^2/g$ to 450 $m^2/g$.

Pore volume of a porous zirconium hydroxide is optionally at or greater than 0.1 $cm^3/g$, optionally at or greater than 0.3 $cm^3/g$. In some aspects, pore volume is 0.1 $cm^3/g$ to 1.2 $cm^3/g$, or any value or range therebetween, optionally 0.3 $cm^3/g$ to 1.2 $cm^3/g$, optionally 0.1 $cm^3/g$ to 0.9 $cm^3/g$, optionally 0.3 $cm^3/g$ to 0.9 $cm^3/g$.

When forming the porous zirconium hydroxide, structure directing agents may be added to the precipitation solution to enhance the porosity. Examples of structure directing agents include, but are not limited to glycols, ethers, quaternary ammonium salts, and the like. Examples of glycols include polyethylene glycol and polypropylene glycol. Examples of ethers include dimethyl ether and diethyl ether. Examples of quaternary ammonium salts include tetrapropylammonium bromide and tetrabutylammonium bromide. The use of structure directing agents can greatly affect the porosity of the resulting porous zirconium hydroxide.

Alternatively, zirconium hydroxide may be purchased as a commercial product from vendors that include Magnesium Electron (Flemington, N.J., USA). The structure of zirconium hydroxide, $Zr(OH)_4$, may be represented as a two-dimensional square lattice, each connected by a double hydroxyl bridge yielding a stoichiometric $Zr(OH)_4$. $Zr(OH)_4$ particles contain both terminal and bridging hydroxyl groups (Southern et al., *Chem. Mater.* 14 (2002) 4313; DeCoste et al., *Langmuir* 27 (2011) 9458).

Table 1 below compares the density and porosity of zirconium hydroxide to activated carbon representative of those employed by the prior art in the preparation of filtration media. The carbon was obtained from Calgon Carbon Corporation as product CWS carbon. The $Zr(OH)_4$ was purchased from Magnesium Electron, Inc. (New Jersey, USA). In Table 1, the surface area is expressed in units of $m^2$ per $cm^3$ of filter volume ($m^2/cm^3$) and the pore volume is expressed in units of $cm^3$ pore volume per $cm^3$ filter volume rather than the standard units of $m^2/g$ and $cm^3/g$, respectively. The former units are employed to account for the difference in the density of the two materials.

TABLE 1

| Material | Density | Surface Area | Pore Volume |
| --- | --- | --- | --- |
| Activated Carbon | 0.47 $cm^3/g$ | 520 $m^2/cm^3$ | 0.31 $cm^3/cm^3$ |
| $Zr(OH)_4$ | 0.93 $cm^3/g$ | 415 $m^2/cm^3$ | 0.35 $cm^3/cm^3$ |

$Zr(OH)_4$, because of the higher molecular weight of zirconium relative to carbon, has a much higher density. Filters are filled by volume, not weight. Although not wishing to be bound by any particular theory, it is believed that the surface area and pore volume contained in the filter volume is far more important than the specific surface area (expressed in units of $m^2/g$) and specific pore volume (expressed in units of $cm^3/g$).

Porous zirconium hydroxide is optionally impregnated with one or more transition metal reactants. A transition metal reactant is a transition metal component capable of reacting with a toxic chemical or a byproduct thereof. Illustrative examples of transition metal reactants include metal sulfates, nitrates and/or chlorides at sufficient levels to promote the removal of target toxic chemicals when used as a filtration media. Metal salts are optionally sulfates, chlorides and nitrates of vanadium, chromium, manganese, iron, cobalt, nickel, copper, zinc, sodium, magnesium, potassium and calcium. In some aspects, sulfates and chlorides of iron, cobalt, nickel, copper and zinc are used. In some aspects, chlorides of cobalt, nickel and zinc are used. Zinc chloride is the only transition metal reactant used in some aspects. Specific illustrative examples of a transition metal reactant include $KMnO_4$, $ZnCl_2$, $CoCl_2$, $Co(NO_3)_2$, $CoSO_4$, $Co(C_2H_3O_2)$, $CuSO_4$, $CuBr$, $CuCl_2$, $Cu(NO_3)_2$, $NiCl_2$, $FeCl_3$, $FeSO_4$.

A transition metal reactant is optionally impregnated to a loading of 1% to 40% by weight, optionally 1% to 30%, optionally 5% to 30%, optionally 5% to 40%, optionally 10% to 30%, optionally 10% to 40% where each percentage is by weight. In some aspect, a transition metal reactant is impregnated to greater than 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, or 39% where the maximum loading is 40% and all percentages are expressed by weight.

For impregnation, the porous zirconium hydroxide is first dried. For example, zirconium hydroxide powder is first dried to below 10% water loading, optionally to below 3% water loading. Drying is accomplished using techniques known to one skilled in the art, such as for example heating in a forced convection oven, or heating under vacuum. When drying, it is important not to over-heat the zirconium hydroxide, as over-heating will bring about dehydroxylation of the substrate. While dehydroxylation is dependent upon both the time and the temperature, it is recommended that drying of the zirconium hydroxide be performed in a forced convection oven or similar at a temperature not to exceed 300° C., optionally not to exceed 150° C., for a time suitable to achieve a moisture content of below 10%, optionally below 3%. Microwave drying, if properly controlled, may also be employed. Once dry, the porous zirconium hydroxide substrate is ready for impregnation.

Impregnation is performed using techniques known to one skilled in the art, such as for example rotary evaporation, dipping, spraying or incipient wetness, with incipient wetness being the preferred technique. As per incipient wetness, an aqueous solution with a known metal salt concentration is prepared. The volume of solution is sufficient to fill the pores of the zirconium hydroxide substrate and the metal salt content is sufficient to achieve the desired loading. The concentration of the metal salt solution is sufficient or as necessary to achieve the desired target mass loading. Illustrative metal salt concentrations in the solution are from 5% to 50% by weight, or any value or range therebetween. The metal salt solution may be obtained directly as a commodity, then diluted to the desired concentration necessary to impregnate the zirconium hydroxide to incipient wetness and achieve the desired metal salt loading. Alternatively, the metal salt solution can be prepared by dissolving the metal salt in a sufficient amount of water, such as DI, in order to achieve a solution of the desired metal salt concentration. In yet another technique, the corresponding metal oxide may be dissolved in an aqueous solution using the corresponding mineral acid. For example, zinc oxide may be dissolve in DI water using hydrochloric acid to yield a zinc chloride solution of the desired zinc chloride concentration. When preparing the salt solution, obtaining metal salts or purchasing the salt solution, it is desired that the salt solution be stoichiometric or near stoichiometric. That is to say, any excess acid, such as HCl or $H_2SO_4$, should be minimized. Otherwise, while the amine removal capability of the media will be increased, the acid gas removal capability of the media will be compromised.

Once impregnation is complete, the impregnated zirconium hydroxide is dried according to techniques known to one skilled in the art, such as for example heating in a forced convection oven, or heating under vacuum. When drying, it is important not to over-heat the material, as over-heating will bring about degradation of the substrate. While said degradation is a dependent upon both the time and the temperature, it is recommended that drying of the zirconium hydroxide be performed in a forced convection oven or similar at a temperature not to exceed 300° C. and preferably not to exceed 150° C. for a time suitable to achieve a pre-determined moisture content. The metal salt-containing zirconium hydroxide should be dried to a moisture content below about 10% and preferably to below about 5%. Microwave drying, if properly controlled, may be employed.

Although the techniques presented above for loading metal salts into the pores of zirconium hydroxide have described using zirconium hydroxide in the powdered form, these techniques can readily be applied to zirconium hydroxide prepared as granules, beads, or other solid forms.

A transition metal reactant is included in a porous zirconium hydroxide at a concentration sufficient to react with a toxic chemical or byproduct thereof. Optionally, a transition metal reactant is present at 1 to 50 weight percent of the sorbent. In some aspects, a transition metal reactant is present at a weight percent of 1 to 40, optionally 1 to 30, optionally 1 to 20, optionally 1 to 19, optionally 1 to 18, optionally 1 to 17, optionally 1 to 16, optionally 1 to 15, optionally 1 to 14, optionally 1 to 13, optionally 1 to 12, optionally 1 to 11, optionally 1 to 10, optionally 1 to 9, optionally 1 to 8, optionally 1 to 7, optionally 1 to 6, optionally 1 to 5, optionally 2 to 10, optionally 5 to 10.

For many applications, such as chemical filtration, it is desired that the metal-containing zirconium hydroxide be in an engineered form, such as for example beads, granules, cylinders, etc. Forming the metal salt-containing zirconium hydroxide powder into an engineered form can be accomplished using techniques known to one skilled in the art. One technique involves briquetting or tableting the metal salt-containing zirconium hydroxide powder using an appropriate device, such as for example a roll compactor or a tableting machine. The resulting briquettes or tablets are then ground using such as for example a hammer mill or jaw crusher to reduce the briquettes or tablets into granules. Product granules are then sieved to the appropriate mesh size, such as for example 6×12 mesh, 12×30 mesh, 20×40 mesh, 40×140 mesh, etc.

The filtration media has an acid gas removal capacity and a basic gas removal capacity. Acid gas removal capacity is optionally between 10 mg and 100 mg gas per gram of filtration media, optionally greater than 50 mg/g. Basic gas removal is optionally The original goal of designing the porous zirconium hydroxide was to develop a high-capacity acid gas removal material. While the material of the present invention possesses an extremely high acid removal capacity, the material of the present invention was unexpectedly also found to possess a significant capacity for the removal of basic gases. While not wishing to be bound by any one particular theory, one possible explanation for the high amine, such as $NH_3$, and acid gas, such as $SO_2$, removal capability stems from the method of preparation coupled with the surface properties of zirconium hydroxide. When preparing an impregnation solution, such as for example one involving zinc chloride, zinc chloride is not the species dissolved in solution. Rather, zinc ($Zn^{2+}$) ions and chloride ($Cl^-$) ions are dissolved in solution. Likely, upon contact with the metal salt impregnation solution, such as zinc chloride, the salt ions, such as chloride ions, are first interacting with the terminal hydroxyl groups associated with zirconium hydroxide, yielding an adsorbed salt, such as chloride, and liberating a hydroxyl ion ($OH^-$). The metal ions, such as zinc ions, then become deposited as the corresponding metal or metal oxide, such as zinc hydroxide or zinc oxide (both of which are relatively insoluble in water). It is only when all the surface hydroxyls have interacted/exchanged with the salt ions, such as chloride ions, and the material begins to dry (during the drying operation), does the metal salt, such as zinc chloride, begin to deposit on the surface. As a result, the material is comprised of a mixture of metal hydroxides/oxides, metal salts and a zirconium salt surface, such as zinc hydroxide/oxide and zinc chloride supported on a chlorinated zirconium hydroxide substrate. While not wishing to be bound by any theory, it is believed that a portion of the metal will exist as both hydroxides and oxides, as the hydroxide may decompose to yield the oxide during drying, etc. The net result of the impregnation is a material with a high capacity for the removal of both amines, such as ammonia, and acid gases, such as sulfur dioxide.

In the examples that follow, $NH_3$ is used as a representative amine due to its industrial use. $SO_2$ is used as a representative acid gas. $SO_2$ is a weak acid and is often design limiting for a filtration media. HCN will react directly with zinc oxide or zinc hydroxide to form zinc cyanide and is used to probe the surface for the presence of zinc oxide/hydroxide.

EXAMPLES

Example 1 (Comparative)

Zirconium hydroxide powder was obtained from MEL chemicals. The powder was formed into 20×40 mesh granules for testing by first tableting the zirconium hydroxide using a tableting machine. Resulting tablets were ground using a jaw crusher, then sieved to yield 20×40 mesh granules.

The resulting 20×40 mesh granules were evaluated for their ability to filter $NH_3$ and $SO_2$. A 1.0 cm deep bed of 20×40 mesh granules was exposed to 1,440 ppm $NH_3$ in air at 15% RH employing a linear velocity of 6.6 cm/s. The $NH_3$ breakthrough time was recorded to be 12 minutes. A 1.0 cm deep bed of 20×40 mesh granules was exposed to 1,500 ppm $SO_2$ in air at 15% RH employing a linear velocity of 6.6 cm/s. The $SO_2$ breakthrough time was recorded to be 42 minutes. Although having a low $NH_3$ removal capacity, the material highly effective in its ability to filter $SO_2$.

Example 2 (Comparative)

500 g of zirconium hydroxide powder with a moisture content of less than 3% was impregnated with sulfuric acid solution sufficient to achieve a sulfate loading of 10%. The impregnation solution was prepared by diluting 100 g of a 50% $H_2SO_4$ solution to a volume of 325 ml using DI water. The impregnation solution was added to the zirconium hydroxide powder, and the damp powder was blended by hand following completion of the impregnation operation. The volume of solution was sufficient to achieve incipient wetness. The resulting impregnated powder was dried in a forced convection oven at 90° C. for 36 hours. Once dry, the powder was formed into 20×40 mesh granules.

The resulting 20×40 mesh granules were evaluated for their ability to filter $NH_3$ and $SO_2$. A 1.0 cm deep bed of 20×40 mesh granules was exposed to 1,440 ppm $NH_3$ in air at 15% RH employing a linear velocity of 6.6 cm/s. The $NH_3$ breakthrough time was recorded to be 50 minutes. A 1.0 cm deep bed of 20×40 mesh granules was exposed to 1,500 ppm $SO_2$ in air at 15% RH employing a linear velocity of 6.6 cm/s. The $SO_2$ breakthrough time was recorded to be 2 minutes. Although having a high $NH_3$ removal capacity, the material is unable to effectively filter $SO_2$.

Example 3 (Comparative)

500 g of zirconium hydroxide powder with a moisture content of less than 3% was impregnated with hydrochloric acid solution sufficient to achieve a chloride loading of 10%. The impregnation solution was prepared by diluting 135 g of a 37% HCl solution to a volume of 325 ml using DI water. The impregnation solution was added to the zirconium hydroxide powder, and the damp powder was blended by hand following completion of the impregnation operation. The volume of solution was sufficient to achieve incipient wetness. The resulting impregnated powder was dried in a forced convection oven at 90° C. for 36 hours. Once dry, the powder was formed into 20×40 mesh granules.

The resulting 20×40 mesh granules were evaluated for their ability to filter $NH_3$ and $SO_2$. A 1.0 cm deep bed of 20×40 mesh granules was exposed to 1,440 ppm $NH_3$ in air at 15% RH employing a linear velocity of 6.6 cm/s. The $NH_3$ breakthrough time was recorded to be 47 minutes. A 1.0 cm deep bed of 20×40 mesh granules was exposed to 1,500 ppm $SO_2$ in air at 15% RH employing a linear velocity of 6.6 cm/s. The $SO_2$ breakthrough time was recorded to be less than 1 minute. Although having a high $NH_3$ removal capacity, the material is unable to effectively filter $SO_2$.

Example 4 (Comparative)

A 10% copper impregnated, activated carbon was prepared by dissolving 17.4 g of $Cu_2(OH)_2CO_3$ in a solution comprised of 50 g $NH_4OH$ solution and 10 g ammonium carbonate solution, with the entire solution brought to a volume of 100 ml. The solution was used to impregnate 90 g of dried coconut carbon (20×40 mesh granules, obtained from Sutcliffe). Once impregnated, the material was spread across a sieve tray and dried at 80° C. for 1 hour, with the temperature then ramped to 180° C. in 3 hours, with the final temperature maintained for 1 hour, at which time the media was cooled.

The resulting 20×40 mesh granules were evaluated for their ability to filter $NH_3$ and $SO_2$. A 1.0 cm deep bed of 20×40 mesh granules was exposed to 1,440 ppm $NH_3$ in air at 15% RH employing a linear velocity of 6.6 cm/s. The $NH_3$ breakthrough time was recorded to be less than 2 minutes. A 1.0 cm deep bed of 20×40 mesh granules was exposed to 1,500 ppm $SO_2$ in air at 15% RH employing a linear velocity of 6.6 cm/s. The $SO_2$ breakthrough time was recorded to be 19 minutes. Although having a viable $SO_2$ removal capacity, the material is unable to effectively filter $NH_3$.

Example 5 (Comparative)

A 20° % zinc chloride impregnated, activated carbon was prepared by dissolving 20 g of zinc chloride in 100 ml of DI water. The solution was used to impregnate 90 g of dried coconut carbon (20×40 mesh granules, obtained from Sutcliffe). Once impregnated, the material was spread across a sieve tray and dried at 80° C. for 1 hour, with the temperature then ramped to 180° C. in 3 hours, with the final temperature maintained for 1 hour, at which time the media was cooled.

The resulting 20×40 mesh granules were evaluated for their ability to filter $NH_3$ and $SO_2$. A 1.0 cm deep bed of 20×40 mesh granules was exposed to 1,440 ppm $NH_3$ in air at 15% RH employing a linear velocity of 6.6 cm/s. The $NH_3$ breakthrough time was recorded to be 53 minutes. A 1.0 cm deep bed of 20×40 mesh granules was exposed to 1,500 ppm $SO_2$ in air at 15% RH employing a linear velocity of 6.6 cm/s. The $SO_2$ breakthrough time was recorded to be 3 minutes. Although having a viable $NH_3$ removal capacity, the material is unable to effectively filter $SO_2$.

Example 6

5.0 g of iron(II) chloride were dissolved in 80 ml of DI water. The pH of the solution was measured to be less than 1.0. The solution was used to impregnate 100 g of dried $Zr(OH)_4$ powder purchased form MEL Chemicals in Flemington, N.J. Following impregnation, the powder was dried overnight in a forced convection oven at 110° C. In the morning, the powder was transformed into 20×40 mesh particles using a tableting machine. The density of the particles was 1.05 g/cm³. The material is 5% iron chloride by weight, and 1.8% chlorine by weight.

A second material was prepared by dissolving 10.0 g of iron(II) chloride in 80 ml of DI water. The pH of the solution was measured to be less than 1.0. The solution was used to impregnate 100 g of dried $Zr(OH)_4$ powder. Following impregnation, the powder was dried overnight in a forced convection oven at 110° C. In the morning, the powder was transformed into 20×40 mesh particles using a tableting machine. The density of the particles was 1.12 g/cm³. The material is 10% iron chloride by weight, and 3.6% chlorine by weight.

A third material was prepared by dissolving 20.0 g of iron(II) chloride in 80 ml of DI water. The pH of the solution was measured to be less than 1.0. The solution was used to impregnate 100 g of dried $Zr(OH)_4$ powder. Following impregnation, the powder was dried overnight in a forced convection oven at 110° C. In the morning, the powder was transformed into 20×40 mesh particles using a tableting machine. The density of the particles was 1.10 g/cm³. The material is 20% iron chloride by weight, and 7.1% chlorine by weight.

The resulting 20×40 mesh granules were evaluated for their ability to filter $NH_3$ and $SO_2$ according to the procedure described previously. The Table below reports $NH_3$ and $SO_2$ breakthrough times for each material relative to the materials of Examples 1 and 3.

| Material | $NH_3$ Breakthrough Time | $SO_2$ Breakthrough Time |
| --- | --- | --- |
| $Zr(OH)_4$ (Example 1) | 12 minutes | 42 min |
| 10% HCl/$Zr(OH)_4$ (Example 3) | 47 min | <1 min |
| 5% $FeCl_2$/$Zr(OH)_4$ | 27 min | 31 min |
| 10% $FeCl_2$/$Zr(OH)_4$ | 42 min | 25 min |
| 20% $FeCl_2$/$Zr(OH)_4$ | 67 min | 18 min |

Example 7

5.0 g of iron(III) sulfate were dissolved in 80 ml of DI water. The pH of the solution was measured to be 1.35. The solution was used to impregnate 100 g of dried $Zr(OH)_4$ powder purchased form MEL Chemicals in Flemington, N.J. Following impregnation, the powder was dried overnight in a forced convection oven at 110° C. In the morning, the powder was transformed into 20×40 mesh particles using a tableting machine. The density of the particles was 1.03 g/cm³. The material is 5% iron sulfate by weight, and 1.8% sulfate by weight.

A second material was prepared by dissolving 10.0 g of iron(III) sulfate in 80 ml of DI water. The pH of the solution was measured to be 1.17. The solution was used to impregnate 100 g of dried 2123 $Zr(OH)_4$ powder. Following impregnation, the powder was dried overnight in a forced convection oven at 110° C. In the morning, the powder was transformed into 20×40 mesh particles using a tableting machine. The density of the particles was 1.05 g/cm³. The material is 10% iron sulfate by weight, and 3.6% sulfate by weight.

A third material was prepared by dissolving 20.0 g of iron(III) sulfate in 80 ml of DI water. The pH of the solution was measured to be 1.0. The solution was used to impregnate 100 g of dried 2123 $Zr(OH)_4$ powder. Following impregnation, the powder was dried overnight in a forced convection oven at 110° C. In the morning, the powder was transformed into 20×40 mesh particles using a tableting machine. The density of the particles was 1.13 g/cm³. The material is 20% iron sulfate by weight, and 7.2% sulfate by weight.

The resulting 20×40 mesh granules were evaluated for their ability to filter $NH_3$ and $SO_2$ according to the procedure described previously. The Table below reports $NH_3$ and $SO_2$ breakthrough times for each material relative to the materials of Examples 1 and 2.

| Material | $NH_3$ Breakthrough Time | $SO_2$ Breakthrough Time |
| --- | --- | --- |
| $Zr(OH)_4$ (Example 1) | 12 min | 42 min |
| 10% $H_2SO_4$/$Zr(OH)_4$ (Example 2) | 50 min | 2 min |
| 5% $Fe_2(SO_4)_3$/$Zr(OH)_4$ | 25 min | 34 min |
| 10% $Fe_2(SO_4)_3$/$Zr(OH)_4$ | 32 min | |
| 20% $Fe_2(SO_4)_3$/$Zr(OH)_4$ | 52 min | 20 min |

Example 8

5.0 g of cobalt chloride were dissolved in 80 ml of DI water. The pH of the solution was measured to be 4.5. The solution was used to impregnate 100 g of dried $Zr(OH)_4$ powder purchased form MEL Chemicals In Flemington, N.J. Following impregnation, the powder was dried overnight in a forced convection oven at 110° C. In the morning, the powder was transformed into 20×40 mesh particles using a tableting machine. The density of the particles was 1.04 g/cm³. The material is 5% cobalt chloride by weight, and 1.5% chloride by weight.

A second material was prepared by dissolving 10.0 g of cobalt chloride in 80 ml of DI water. The pH of the solution was measured to be 4.45. The solution was used to impregnate 100 g of dried $Zr(OH)_4$ powder. Following impregnation, the powder was dried overnight in a forced convection oven at 110° C. In the morning, the powder was transformed into 20×40 mesh particles using a tableting machine. The density of the particles was 1.07 g/cm$^3$. The material is 10% cobalt chloride by weight, and 3.0% chloride by weight.

A third material was prepared by dissolving 20.0 g of cobalt chloride in 80 ml of DI water. The pH of the solution was measured to be 4.25. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.11 g/cm$^3$. The material is 20% cobalt chloride by weight, and 6.0% chloride by weight.

A fourth material was prepared by dissolving 40.0 g of cobalt chloride in 80 ml of DI water. The pH of the solution was measured to be 4.0. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.16 g/cm$^3$. The material is 40% cobalt chloride by weight, and 12.0% chloride by weight.

The resulting 20×40 mesh granules were evaluated for their ability to filter NH$_3$ and SO$_2$ according to the procedure described previously. The Table below reports NH$_3$ and SO$_2$ breakthrough times for each material relative to the materials of Examples 1 and 3.

| Material | NH$_3$ Breakthrough Time | SO$_2$ Breakthrough Time |
| --- | --- | --- |
| Zr(OH)$_4$ (Example 1) | 12 minutes | 42 min |
| 10% HCl/Zr(OH)$_4$ (Example 3) | 47 min | <1 min |
| 5% CoCl$_2$/Zr(OH)$_4$ | 28 min | 36 min |
| 10% CoCl$_2$/Zr(OH)$_4$ | 45 min | 34 min |
| 20% CoCl$_2$/Zr(OH)$_4$ | 78 min | 29 min |
| 40% CoCl$_2$/Zr(OH)$_4$ | 145 min | 21 min |

Example 9

5.0 g of cobalt sulfate were dissolved in 80 ml of DI water. The pH of the solution was measured to be 4.4. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 0.98 g/cm$^3$. The material is 5% cobalt sulfate by weight, and 1.8% sulfate by weight.

A second material was prepared by dissolving 10.0 g of cobalt sulfate in 80 ml of DI water. The pH of the solution was measured to be 3.8. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.0 g/cm$^3$. The material is 10% cobalt sulfate by weight, and 3.6% sulfate by weight.

A third material was prepared by dissolving 20.0 g of cobalt sulfate in 80 ml of DI water. The pH of the solution was measured to be 3.5. The solution was used to impregnate 100 g of dried Zr(OH)$_4$ powder. Following impregnation, the powder was dried overnight in a forced convection oven at 110° C. In the morning, the powder was transformed into 20×40 mesh particles using a tablletting machine. The density of the particles was 1.04 g/cm$^3$. The material is 20% cobalt sulfate by weight, and 7.3% sulfate by weight.

The resulting 20×40 mesh granules were evaluated for their ability to filter NH$_3$ and SO$_2$ according to the procedure described previously. The Table below reports NH$_3$ and SO$_2$ breakthrough times for each material relative to the materials of Examples 1 and 2.

| Material | NH$_3$ Breakthrough Time | SO$_2$ Breakthrough Time |
| --- | --- | --- |
| Zr(OH)$_4$ (Example 1) | 12 min | 42 min |
| 10% H$_2$SO$_4$/Zr(OH)$_4$ (Example 2) | 50 min | 2 min |
| 5% CoSO$_4$/Zr(OH)$_4$ | 22 min | |
| 10% CoSO$_4$/Zr(OH)$_4$ | 28 min | |
| 20% CoSO$_4$/Zr(OH)$_4$ | 50 min | 24 min |

Example 10

5.0 g of nickel chloride were dissolved in 80 ml of DI water. The pH of the solution was measured to be 6.1. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 0.97 g/cm$^3$. The material is 5% nickel chloride by weight, and 1.5% chloride by weight.

A second material was prepared by dissolving 10.0 g of nickel chloride in 80 ml of DI water. The pH of the solution was measured to be 5.50. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 0.98 g/cm$^3$. The material is 10% nickel chloride by weight, and 3.0% chloride by weight.

A third material was prepared by dissolving 20.0 g of nickel chloride in 80 ml of DI water. The pH of the solution was measured to be 4.90. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.00 g/cm$^3$. The material is 20% nickel chloride by weight, and 6.0% chloride by weight.

The resulting 20×40 mesh granules were evaluated for their ability to filter NH$_3$ and SO$_2$ according to the procedure described previously. The Table below reports NH$_3$ and SO$_2$ breakthrough times for each material relative to the materials of Examples 1 and 3.

| Material | NH$_3$ Breakthrough Time | SO$_2$ Breakthrough Time |
| --- | --- | --- |
| Zr(OH)$_4$ (Example 1) | 12 minutes | 42 min |
| 10% HCl/Zr(OH)$_4$ (Example 3) | 47 min | <1 min |
| 5% NiCl$_2$/Zr(OH)$_4$ | 29 min | |
| 10% NiCl$_2$/Zr(OH)$_4$ | 46 min | |
| 20% NiCl$_2$/Zr(OH)$_4$ | 73 min | 26 min |

Example 11

5.0 g of nickel sulfate were dissolved in 80 ml of DI water. The pH of the solution was measured to be 2.9. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 0.95 g/cm³. The material is 5% nickel sulfate by weight, and 1.8% sulfate by weight.

A second material was prepared by dissolving 10.0 g of nickel sulfate in 80 ml of DI water. The pH of the solution was measured to be 2.7. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.03 g/cm³. The material is 10% nickel sulfate by weight, and 3.7% sulfate by weight.

A third material was prepared by dissolving 20.0 g nickel sulfate in 80 ml of DI water. The pH of the solution was measured to be 2.4. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.12 g/cm³. The material is 20% nickel sulfate by weight, and 7.3% sulfate by weight.

The resulting 20×40 mesh granules were evaluated for their ability to filter NH$_3$ and SO$_2$ according to the procedure described previously. The Table below reports NH$_3$ and SO$_2$ breakthrough times for each material relative to the materials of Examples 1 and 2.

| Material | NH$_3$ Breakthrough Time | SO$_2$ Breakthrough Time |
|---|---|---|
| Zr(OH)$_4$ (Example 1) | 12 min | 42 min |
| 10% H$_2$SO$_4$/Zr(OH)$_4$ (Example 2) | 50 min | 2 min |
| 5% NiSO$_4$/Zr(OH)$_4$ | 23 min | |
| 10% NiSO$_4$/Zr(OH)$_4$ | 35 min | |
| 20% NiSO$_4$/Zr(OH)$_4$ | 59 min | 28 min |

Example 12

5.0 g of zinc chloride were dissolved in 80 ml of DI water using 2 ml of HCl. The pH of the solution was measured to be 1.8 The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.15 g/cm³. The material is 5% zinc chloride by weight, and 2.6% chloride by weight.

A second material was prepared by dissolving 10.0 g of zinc chloride in 80 ml of DI water using four drops of HCl. The pH of the solution was measured to be 4.50. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.13 g/cm³. The material is 10% zinc chloride by weight, and 5.2% chloride by weight.

A third material was prepared by dissolving 20.0 g of zinc chloride in 80 ml of DI water using four drops of HCl. The pH of the solution was measured to be 4.30. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.21 g/cm³. The material is 20% zinc chloride by weight, and 10.4% chloride by weight.

A fourth material was prepared as follows. 87.5 g of zinc chloride were dissolved in 175 ml of DI water. The pH of the solution was measured to be 3.2. The solution was used to impregnate 250 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.24 g/cm³. The material is 35% zinc chloride by weight, and 18.2% chloride by weight.

The following table reports surface area and pore volume data for the unimpregnated Zr(OH)$_4$ substrate, and for the substrate impregnated with 34% ZnCl$_2$. The decrease in porosity is due to the presence of zinc chloride in the pores of the material.

| Summary of porosity data for ZnCl$_2$ impregnated samples | | |
|---|---|---|
| Sample | Surface Area | Pore Volume |
| Untreated | 377 m²/g | 0.392 cm³/g |
| 35% ZnCl$_2$ | 207 m²/g | 0.215 cm³/g |

The resulting 20×40 mesh granules were evaluated for their ability to filter NH$_3$ and SO$_2$ according to the procedure described previously. The Table below reports NH$_3$ and SO$_2$ breakthrough times for each material relative to the materials of Examples 1 and 2.

| Material | NH$_3$ Breakthrough Time | SO$_2$ Breakthrough Time |
|---|---|---|
| Zr(OH)$_4$ (Example 1) | 12 minutes | 42 min |
| 10% HCl/Zr(OH)$_4$ (Example 3) | 47 min | <1 min |
| 5% ZnCl$_2$/Zr(OH)$_4$ | 39 min | |
| 10% ZnCl$_2$/Zr(OH)$_4$ | 66 min | |
| 20% ZnCl$_2$/Zr(OH)$_4$ | 99 min | 29 min |
| 35% ZnCl$_2$/Zr(OH)$_4$ | 167 min | 24 min |

20×40 mesh granules of 35% ZnCl$_2$/Zr(OH)$_4$ were evaluated for their ability to filter NH$_3$ and SO$_2$ according to the procedure described previously, with the exception that the media was pre-humidified at 80% RH overnight, then tested at 80% RH. The Table below reports NH$_3$ and SO$_2$ breakthrough times for each material. Results demonstrate that the material is able to successfully function under conditions of both low and high relative humidity.

| Material | NH$_3$ Breakthrough Time | SO$_2$ Breakthrough Time |
|---|---|---|
| 35% ZnCl$_2$/Zr(OH)$_4$ (80% RH) | 171 min | 29 min |

Example 13

5.0 g of zinc sulfate was dissolved in 80 ml of DI water. The pH of the solution was measured to be 4.3. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.05 g/cm$^3$. The material is 5% zinc sulfate by weight, and 1.7% sulfate by weight.

A second material was prepared by dissolving 10.0 g of zinc sulfate in 80 ml of DI water. The pH of the solution was measured to be 4.2. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.07 g/cm$^3$. The material is 10% zinc sulfate by weight, and 3.3% sulfate by weight.

A third material was prepared by dissolving 20.0 g of zinc sulfate in 80 ml of DI water. The pH of the solution was measured to be 4.0. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.08 g/cm$^3$. The material is 20% zinc sulfate by weight, and 6.7% sulfate by weight.

The resulting 20×40 mesh granules were evaluated for their ability to filter NH$_3$ and SO$_2$ according to the procedure described previously. The Table below reports NH$_3$ and SO$_2$ breakthrough times for each material relative to the materials of Examples 1 and 2.

| Material | NH$_3$ Breakthrough Time | SO$_2$ Breakthrough Time |
| --- | --- | --- |
| Zr(OH)$_4$ (Example 1) | 12 min | 42 min |
| 10% H$_2$SO$_4$/Zr(OH)$_4$ (Example 2) | 50 min | 2 min |
| 5% ZnSO$_4$/Zr(OH)$_4$ | 23 min | |
| 10% ZnSO$_4$/Zr(OH)$_4$ | 31 min | |
| 20% ZnSO$_4$/Zr(OH)$_4$ | 48 min | 22 min |

Example 14

20.0 g of sodium chloride were dissolved in 75 ml of DI water. The pH of the solution was measured to be 6.75. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.04 g/cm$^3$. The material is 20% sodium chloride by weight, and 12% chloride by weight.

Example 15

20.0 g of potassium chloride were dissolved in 75 ml of DI water. The pH of the solution was measured to be 9.3. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.03 g/cm$^3$. The material is 20% potassium chloride by weight, and 9.5% chloride by weight.

Example 16

20.0 g of magnesium chloride hexahydrate were dissolved in 75 ml of DI water. The pH of the solution was measured to be 7.65. The solution was used to impregnate 100 g of dried Zr(OH)$_4$ powder. Following impregnation, the powder was dried overnight in a forced convection oven at 110° C. In the morning, the powder was transformed into 20×40 mesh particles using a tableting machine. The density of the particles was 1.07 g/cm$^3$. The material is 25% magnesium chloride by weight, and 7.0% chloride by weight.

20×40 mesh granules of sodium chloride (Ex. 14), potassium chloride (Ex. 15) and magnesium chloride were evaluated for their ability to filter NH$_3$ and SO$_2$ according to the procedure described previously. The Table below reports NH$_3$ and SO$_2$ breakthrough times for each material relative to the materials of Examples 1 and 3.

| Material | NH$_3$ Breakthrough Time | SO$_2$ Breakthrough Time |
| --- | --- | --- |
| Zr(OH)$_4$ (Example 1) | 12 minutes | 42 min |
| 10% HCl/Zr(OH)$_4$ (Example 3) | 47 min | <1 min |
| 20% NaCl/Zr(OH)$_4$ | 17 min | 35 min |
| 20% KCl/Zr(OH)$_4$ | 14 min | 36 min |
| 20% MgCl$_2$/Zr(OH)$_4$ | 43 min | 31 min |

Example 17

A portion of the 35% ZnCl$_2$/Zr(OH)$_4$ of Example 10 was dried at 200° C. for 3 hours. A second portion was dried at 300° C. for 3 hours. Upon completion of the drying operation, the materials were evaluated for their ability to remove NH$_3$ and SO$_2$ according to the procedure described in Example 1. Results demonstrate that drying at 200° C. increases NH$_3$ removal at the expense of SO$_2$ removal. Results also indicate that drying at 300° C. will not impact NH$_3$ removal but will decrease SO$_2$ removal by greater than 50%.

| Material 35% ZnCl$_2$/Zr(OH)$_4$ | NH$_3$ Breakthrough Time | SO$_2$ Breakthrough Time |
| --- | --- | --- |
| Dried 110° C. | 167 min | 24 min |
| Dried 200° C. | 200 min | 19 min |
| Dried 300° C. | 171 min | 10 min |

Example 18

A portion of the zirconium hydroxide of Example 1, a portion of the 10% HCl/Zr(OH)$_4$ of Example 3 and a portion of the 35% ZnCl$_2$/Zr(OH)$_4$ of Example 10 were evaluated for their ability to remove HCN. HCN will react with zinc oxide or zinc hydroxide to form zinc cyanide (Zn(CN)$_2$). The reaction allows one to ascertain the presence of zinc oxide and/or zinc hydroxide on the surface of the ZnCl$_2$ impregnated material. A 1.0 cm deep bed of 20×40 mesh granules was exposed to 900 ppm HCN in air at 50% RH employing a linear velocity of 6.6 cm/s. Breakthrough was instantaneous when testing the materials of Examples 1 and 3 (comparative). The HCN breakthrough time was recorded to be 21 minutes when using the 35% ZnCl$_2$/Zr(OH)$_4$ of Example 10.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

We claim:

1. A process for removing a basic gas or acid gas from a gaseous sample comprising:
   contacting a gaseous sample comprising a basic gas or acid gas with a filtration media, said filtration media comprising a porous zirconium hydroxide impregnated with a transition metal reactant, wherein said transition metal reactant comprises chlorides, sulfates or nitrates of vanadium, chromium, manganese, iron, nickel, copper, zinc, or combinations thereof at a loading between 1% and 40% by weight.

2. The process of claim 1, wherein said transition metal reactant comprises chlorides, sulfates or nitrates of zinc, nickel, copper, iron, or combinations thereof.

3. The process of claim 1, wherein said sample is air.

4. The process of claim 1, wherein said basic gas comprises $NH_3$, methyl amine, dimethyl amine, or combinations thereof.

5. The process of claim 1, wherein said acid gas comprises HCl, HF, HBr, $SO_3$, $SO_2$, $HNO_3$, $H_2S$, or combinations thereof.

6. The process of claim 1, wherein said filtration media will bind both $NH_3$ and $SO_2$.

7. The process from claim 1, wherein said transition metal reactant comprises a sulfate or chloride of iron, nickel, copper, zinc, or combinations thereof.

8. The process of claim 1, wherein said filtration media has an average pore volume of 0.1 $cm^3$/g or greater.

9. The process of claim 1, wherein said filtration media has a water content of 10% or less.

10. The process of claim 1, wherein said filtration media has a water content of 3% or less.

11. A gas filtration media, comprising:
    a porous metal comprising zirconium hydroxide, zirconium oxyhydroxide, or combinations thereof; and
    a transition metal reactant impregnated onto said porous metal, wherein said transition metal reactant comprises chlorides, sulfates or nitrates of vanadium, chromium, manganese, iron, nickel, copper, zinc, or combinations thereof.

12. The filtration media of claim 11, wherein the porous metal has a pore volume of 0.35 $cm^3/cm^3$ or greater prior to impregnation with the transition metal reactant.

13. The filtration media of claim 11, wherein said transition metal reactant comprises a sulfate or chloride of iron, nickel, copper, zinc, or combinations thereof.

14. The filtration media of claim 11, wherein said transition metal reactant is present at a concentration of 1 to 50 weight percent relative to said porous metal.

15. The filtration media of claim 11, wherein said filtration media has a water content of 10% or less.

16. The filtration media of claim 11, wherein said filtration media has a water content of 3% or less.

17. The filtration media of claim 11, wherein said porous metal has a surface area of from 100 $m^2$/g to 600 $m^2$/g.

18. The filtration media of claim 11, wherein said porous metal has a pore volume of from 0.1 $cm^3$/g to 1.2 $cm^3$/g.

19. The filtration media of claim 11, wherein said porous metal comprises zirconium hydroxide and said transition metal reactant comprises chlorides, sulfates, or nitrates of iron, nickel, copper, zinc or combinations thereof, and said transition metal reactant is present at a loading of from 1% to 40% by weight.

* * * * *